United States Patent Office 3,753,927
Patented Aug. 21, 1973

3,753,927
DICYCLOPENTADIENYL IRON COMPOSITIONS AND METHODS FOR CURING POLYESTER RESINS
John J. Kracklauer, Boulder, Colo., assignor to Syntex Corporation, Apartado, Panama
No Drawing. Filed Oct. 26, 1970, Ser. No. 84,243
Int. Cl. C08g 17/10, 17/12
U.S. Cl. 252—428
7 Claims

ABSTRACT OF THE DISCLOSURE

Novel compositions and methods employing same are discussed as useful in the peroxide induced cure of polyester resins. The compositions and methods employ a new promoter system having, as a principal component, a monosubstituted dicyclopentadienyl iron compound, wherein the substituent is a carbonyl containing substituent, e.g. acetyl, and, as second components, a member(s) selected from an exemplified group including various phosphorous compounds, an ascorbic acid compound, a stannous salt or soap, or an ammonium or alkali metal hydrogen sulfite.

---

The present invention relates to the art of effecting cure of polyester resins and to novel methods and compositions useful therefor. More particularly, the present invention is directed to effecting and improving the peroxide induced cure of polyester resin compositions by methods employing and compositions containing a promotor system of a specific class, to provide high quality product which can be notably free of color.

The art of curing polyester resins is fairly well developed—see U.S. Pats. 3,003,991, 3,238,274, and 3,480,561, for example—and various tests and standards have been developed which establish criteria for determining the efficacy of various cure catalyst systems and the quality of final product. The various problems associated with developing efficient catalyst systems which provide acceptable product are also well recognized. Thus, various classes of accelerators for this purpose have been proposed, such as metal salts, e.g., salts of iron, cobalt, and vanadium (including the naphthenates) either alone or in combination with an acid phosphate, ester or benzene phosphinic acid; Lewis acids; ferrocene; amines; and so forth. However, the art is still in need of a promotor or accelerator system which in use can combine the advantageous features of high quality cure and low color product with general high order efficacy.

The present invention provides for an accelerator or promotor system which, because of its unique combination of components, gives superior cure effect with high quality lower color product. By virtue of the present invention the disadvantages inherent or otherwise associated with the prior art catalyst or promotor systems are overcome. Thus, in many instances, the novel system of the present invention is superior in effect to the prior art systems, both in the rate and quality of cure and the quality of (low color) product.

The present invention is directed to a novel composition useful in the cure of an unsaturated polyester resin which comprises:

(a) A mono substituted dicyclopentadienyl iron compound of the formula:

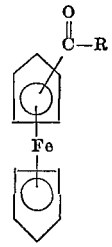

wherein R is hydrogen, lower alkyl, lower alkyoxy, or phenyl; and
(b) At least one number selected from the group consisting of a phosphorus compound characterized by the phosphorus atom having at least one of a +3 valence state, a bond with hydrogen, and a bond with hydroxy; an ascorbic acid compound; a stannous salt or soap; and an ammonium or alkali metal hydrogen sulfite or carbonyl addition product thereof;
said (a) and (b) components optionally dispersed in a mutual solvent.

The novel composition of the present invention will contain a mono-substituted dicyclopentadienyl compound as defined above and at least one member selected from the phosphorus compound, ascorbic acid compound, stannous salt or soap, and ammonium or alkali metal hydrogen sulfite, or carbonyl addition product thereof, all as defined above. In the preferred embodiments, one such member is present and is selected from the phosphorus compound or two or more such members are present, one of which is selected from the phosphorus compound, the phosphorus compound being as defined above, preferably phosphoric acid, phosphorous acid, and hypophosphorous acid.

The present invention is also directed to a novel method useful in the cure of an unsaturated polyester resin which comprises: incorporating in said resin a promoting amount of the composition as above defined.

This novel method of the present invention thus involves dispersing the novel composition as defined above in the polyester resin to be cured. Thus, in those instances wherein a mutual solvent is present and is selected from a polyester resin, the novel method hereof comprises the preparation of a novel composition hereof.

The present invention is also directed to a novel method useful in the cure of an unsaturated polyester resin which comprises incorporating in said resin a promoting amount of the composition as above defined and a catalytic amount of a peroxide initiator.

The present invention is further directed to a novel composition comprising an unsaturated polyester resin, an ethylenically unsaturated monomer copolymerizable with said unsaturated polyester resin, and a promoting amount of the composition as above defined.

The present invention is further directed to a novel composition comprising an unsaturated polyester resin, an ethylenically unsaturated monomer copolymerizable with said unsaturated polyester resin, a promoting amount of the composition as above defined and a catalytic amount of a peroxide initiator.

The mutual solvent for the two components of the novel compositions hereof is optionally employed. The nature of the solvent, if employed, is not critical to the present invention. Included are the mono- and di-alkyl ethers of diethylene and triethylene glycol, e.g., diglyme and triglyme; cellosolves; and other common organic solvents such as dioxane, tetrahydrofuran, benzene, toluene, hexane, octane, and the like. In addition, the mutual solvent, if employed, includes the particular unsaturated polyester resin to be cured.

Representative mono substituted dicyclopentadienyl iron compounds of the present invention include:

formyldicyclopentadienyl iron,
acetyldicyclopentadienyl iron,
propionyldicyclopentadienyl iron,
butyroyldicyclopentadienyl iron,
pentanoyldicyclopentadienyl iron,
hexanoyldicyclopentadienyl iron,
carbomethoxydicyclopentadienyl iron,
heptanoyldicyclopentadienyl iron,
octanoyldicyclopentadienyl iron,
carbethoxydicyclopentadienyl iron,
carbopropoxydicyclopentadienyl iron,
carbobutoxydicyclopentadienyl iron,
benzoyldicyclopentadienyl iron, and so forth.

The phosphorus compound of the present invention is selected from those wherein the phosphorus atom is in the +3 valence state and/or is bonded to at least one hydrogen atom and/or hydroxyl group. Representative phosphorus compounds include the alkyl acid phosphites, alkyl acid phosphates, phosphoric acid, hypophosphorous acid, phosphorous acid, trialkyl phosphites, and triarylphosphites such as dimethyl phosphite, diethyl phosphite, dibutyl phosphite, dihexyl phosphite, dioctyl phosphite, methyl acid phosphate, ethyl acid phosphate, butyl acid phosphate, hexyl acid phosphate, octyl acid phosphate, trimethyl phosphite, tributyl phosphite, trioctyl phosphite, triphenyl phosphite, phosphorous acid residues, and the like.

The useful ascorbic acid compounds hereof include the d, l, and racemic isomers of ascorbic acid. Alkali metal hydrogen sulfites are for example, sodium hydrogen sulfite and potassium hydrogen sulfite. The useful stannous salts hereof include both inorganic and organic salts. Representative stannous salts and soaps include stannous sulfate, stannous naphthenate, stannous octoate, stannous laurate, stannous hypophosphite, and the like.

The ratio of the amounts of the components of the composition hereof can vary over a wide range. Thus, whether or nor dispersed in a mutual solvent such as the polyester resin, the monosubstituted dicyclopentadienyl iron component and the phosphorus compound, if and when present, are present in a ratio of from about 50:1 to about 1:1000. Similarly, the monosubstituted dicyclopentadienyl iron compound to stannous salt ratio, if and when present, is from about 200:1 to about 1:500; monosubstituted dicyclopentadienyl iron compound to ascorbic acid compound ratio, if and when present, from about 100:1 to about 1:100; and monosubstituted dicyclopentadienyl iron compound to ammonium or alkali metal hydrogen sulfite ratio, if and when present, from about 100:1 to about 1:100.

These relative amounts when translated into terms of concentration, when present in the polyester resin to be cured, range as follows:

|  | P.p.m. |
|---|---|
| Monosubstituted dicyclopentadienyl iron compounds | 10–1000 |
| Phosphorus compounds | 20–10,000 |
| Stannous salt or soap | 5–5000 |
| Ascorbic acid compound | 10–1000 |
| Bisulfite compound | 10–1000 |

The compositions hereof are prepared conveniently by simple mixing of the components.

In the present specification and claims, the term "polyester" refers to the poly condensation products of dicarboxylic acids or anhydrides with polyhydric alcohols. These unsaturated polyesters can also be modified in the polycondensation reaction mixture by the presence of monocarboxylic acid, monohydroxy alcohols, dihydroxy alcohols, and polycarboxylic acids. Useful, common polyester resins of the art include the esterification products of alcohols such as ethylene glycol, diethylene glycol, triethylene glycol, trimethylene glycol, 1,3-butylene glycol, glycerol, mannitol, and the bisphenol-A glycols, and unsaturated dicarboxylic acids such as maleic, fumaric, itaconic, and citraconic acids. These polyester unsaturated resins may be modified by replacement of the unsaturated dibasic acid with an equivalent quantity of another dicarboxylic acid such as, for example, succinic, adipic, sebacic, phthalic, azelaic, tetrahydrophthalic, endomethylenetetrahydrophthalic, or hexachloroendomethylenetetrahydrophthalic acids.

The unsaturated polyester polymers as described above are cured in the presence of an unsaturated monomer capable of copolymerizing with the unsaturated polyester. Examples of such monomeric substances well-known in the polyester art include styrene, vinyltoluene, divinylbenzene, methyl acrylate, methyl methacrylate, acrolein, the diallyl ester of endomethylene tetrahydrophthalic anhydride, ethylene glycol dimethyl acrylate, ethylacrylate, acrylonitrile, vinylacetate, diallyl phthalate, the vinyl phenols, diallyl maleate, triallylcyanurate, and so forth.

The polymerization catalyst used in the cure of the unsaturated polyester resins with the unsaturated monomer include the peroxides and the hydroperoxides used in the art. Examples of such catalysts include benzoyl peroxide, chlorobenzoyl peroxide, lauroyl peroxide, caprylyl peroxide, 1-hydroxycyclohexyl hydroperoxide, methyl ethyl ketone peroxide, cumene hydroperoxide, sec-butylbenzene hydroperoxide, 1-methyltetralin hydroperoxide, and so forth. Particularly preferred are benzoyl peroxide and chlorobenzoyl peroxide. Generally, the peroxide catalyst is incorporated in amounts ranging from about 0.05% to about 3% by weight of the total polyester resin composition to be cured.

The monosubstituted dicyclopentadienyl iron compounds useful in the present invention are known and can be prepared in accordance with known procedures. For example, see JACS, 74, 3458 (1952), JACS, 74, 632 (1952) and Kealy & Pauson in Nature, 168, 1039, (1951).

Similarly, the other components of the compositions of the present invention are known compounds and can be prepared in accordance with known methods, for example, see Organophosphorus Compounds by Kosolapoff, John Wiley and Sons, New York, 1950.

The term "lower alkyl" refers to aliphatic straight, or branched chain groups of 1 to 4 carbon atoms and 1 and 2 . . . and 4 and 1 to 2 . . . to 4 carbon atoms; methyl, ethyl, propyl, butyl, the various isomers thereof. "Lower alkyloxy" is "lower alkyl-O" wherein "lower alkyl" is as above defined.

The following examples serve to further illustrate the present invention.

EXAMPLE 1

A standard polyester resin composition is prepared containing the relative proportions of 1 mole each of maleic anhydride and phthalic anhydride and 2.2 moles of propylene glycol and a stabilizing amount of phosphorous acid. This polymer is diluted with 30% styrene containing 0.01% hydroquinone. The resultant mixture is divided into 50 gram samples. To an individual sample is added 100 p.p.m. of one promotor composition (as listed below, Table I) followed by 2% by weight of a 50% paste of benzoyl peroxide in each sample, with the following results:

EXAMPLE 3

Standard polyester resin compositions are prepared as described in Example 1 without the phosphorus acid and individually cured with promotor compositions containing 250 p.p.m. of acetyldicyclopentadienyl iron and one phosphorous compound as follows:

TABLE III

| Phosphorus compound | Phosphorous compound concentration, p.p.m. | Color reduction [1] | Cure activity |
|---|---|---|---|
| None | | 0 | 0. |
| Phosphoric acid | 1,000 | 4.0 | Increase. |
| Hypophosphorous acid | 1,000 | 4.8 | Do. |
| Phosphorous acid | 1,000 | 3.5 | Do. |
| Trialkylphosphite | 10,000 | 2.5 | Do. |

[1] 0 to 5 scale.

TABLE 1

| Promotor | Promotor conc., p.p.m. | Gel time, min. | Exotherm, °C. | Time to exotherm, min. | Cure time | Product color |
|---|---|---|---|---|---|---|
| None | | >1,500 | | | | |
| Dicyclopentadienyl iron | 100 | 7 | 52 | 50 | >24 hours | Yellow. |
| Ethyldicyclopentadienyl iron | 100 | 7 | 46 | 15 | do | Do. |
| N,N-dimethylaminomethyldicyclopentadienyl iron | 100 | 105 | 40 | 315 | do | Do. |
| Acetyldicyclopentadienyl iron | 100 | 25 | 137.5 | 63 | 63 minutes | Colorless. |

EXAMPLE 2

Standard polyester resin compositions are prepared as described in Example 1 and individually cured with several systems as follows:

TABLE II

| Promotor | Promotor conc., p.p.m. | Gel time, min. | Time to cure, min. | Product color |
|---|---|---|---|---|
| Acetyldicyclopentadienyl iron. | 50 | 80 | 100 | Colorless. |
| n-Butyroyldicyclopentadienyl iron. | 100 | 70 | 150 | Do. |
| Formyldicyclopentadienyl iron. | 200 | 30 | 55 | Do. |
| Benzoyldicyclopentadienyl iron. | 100 | 90 | 150 | Do. |

When following the above procedure using 10,000 p.p.m. of dialkylphosphite and dialkylphosphate, good color reduction is observed and recorded in each instance.

EXAMPLE 4

Standard polyester resin compositions are prepared as described in Example 1 without the phosphorous acid and individually cured with acetyldicyclopentadienyl iron (AcFc) together with co-components as follows:

TABLE IV

| AcFc conc., p.p.m. | Co-component | Co-component conc., percent | Polyester resin [1] | Gel time, min. | Cure time, min. | Exotherm, °C. | Product color |
|---|---|---|---|---|---|---|---|
| 250 | None | | 1 | 50 | 75 | 135 | Yellow. |
| 250 | NaHSO₃ / Triphenylphosphite | 1 | 1 | 55 | 80 | 128 | Do. |
| 250 | Trimethylphosphite | 1 | 1 | 12 | 55 | 120 | Do. |
| 250 | Tri-n-butylphosphite | 1 | 1 | 20 | 70 | 120 | Do. |
| 250 | Dimethylphosphate | 1 | 2 | 55 | 90 | 134 | Do. |
| 250 | Di-n-octylphosphite | 1 | 2 | 60 | 105 | 129 | Do. |
| 250 | Hypophosphorous acid | 0.1 | 2 | 27 | 63 | 138 | Do. |
| 200 | do | 0.1 | 2 | 34 | 74 | 127 | Do. |
| 200 | Hypophosphorous acid / Stannous chloride | 0.1 / 0.1 | 2 | 23 | 65 | 133 | Do. |
| 250 | Isoascorbic acid / Dimethyl phosphite | 0.05 / 1 | 1 | 10 | 30 | 134 | Do. |
| 250 | Ascorbic acid / Di-n-octyl phosphite | 0.03 / 1 | 1 | 4 | 19 | 136 | Do. |
| 25 | Isoascorbic acid / Dimethyl phosphite | 0.02 / 1 | 2 | 15 | 54 | 122.5 | Do. |
| 25 | Isoascorbic acid / Dimethyl phosphite | 0.03 / 0.05 | 2 | 13 | 44 | 122 | Do. |
| 50 | Isoascorbic acid / Dimethyl phosphite | 0.03 / 0.03 | 2 | 10 | 30 | 141 | Do. |
| 25 | Isoascorbic acid / Dimethyl phosphite | 0.01 / 0.01 | 2 | 14 | 40 | 139.5 | Do. |
| 12.5 | Isoascorbic acid / Dimethyl phosphite | 0.01 / 0.01 | 2 | 22 | (²) | 56 | Do. |
| 250 | Ascorbic acid | [3] 250 | 2 | 6 | 22 | 137 | Reduced color. |
| 100 | Stannous chloride | [3] 200 | 2 | 43 | 82 | 136 | Do. |
| 200 | Ascorbic acid / Hypophosphorous acid | [3] 100 / [3] 1,000 | 2 | 23 | 65 | 133 | Colorless. |
| 200 | Hypophosphorous acid / Stannous chloride | 1 / 0.1 | 2 | 23 | 65 | 133 | Do. |

[1] 1 Denotes Reichhold Chemicals Inc. standard polyester resin #31-007; 2 Denotes Kopper's Co. Inc. standard polyester resin #1000-25.
[2] Greater than 24 hours.
[3] Parts per million.

What is claimed is:
1. A novel composition useful in the curve of an unsaturated polyester resin which comprises:
(a) a mono substituted dicyclopentadienyl iron compound of the formula:

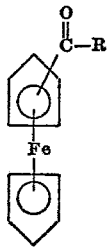

wherein R is hydrogen, lower alkyl, lower alkyloxy, or phenyl; and
(b) at least one member selected from the group consisting of (1) a phosphorus compound characterized by the phosphorus atom having at least one of a +3 valance state, a bond with hydrogen, and a bond with hydroxy and selected from the group consisting of alkyl acid phosphites, alkyl acid phosphates, phosphoric acid, hypophosphorous acid, phosphorous acid, trialkyl phosphites, and triaryl phosphites; (2) an ascorbic acid compound selected from the group consisting of ascorbic acid and isoascorbic acid; (3) a stannous salt or soap selected from the group consisting of stannous sulfate, stannous napthenate, stannous octoate, stannous laurate, and stannous hypophosphite; and (4) an ammonium or alkali metal hydrogen sulfite; said (a) and (b) components optionally dispersed in a mutual solvent.

2. The composition according to claim 1 wherein the mono substituted dicyclopentadiene iron compound is acetyldicyclopentadienyl iron.

3. The composition according to claim 2 wherein the member selected from (b) is selected from the group consisting of phosphoric acid, phosphorous acid, and hypophosphorous acid.

4. The composition according to claim 2 wherein the member selected from (b) is phosphorous acid.

5. The composition according to claim 2 wherein the member selected from (b) is hypophosphorous acid.

6. The composition according to claim 2 wherein the member selected from (b) is selected from the group consisting of ascorbic acid and a stannous salt.

7. The composition according to claim 2 wherein the member selected from (b) is selected from the group consisting of ascorbic acid and a stannous salt plus a second member selected from the group consisting of phosphorous acid and hypophosphorous acid.

References Cited
UNITED STATES PATENTS

| | | | |
|---|---|---|---|
| 3,019,204 | 1/1962 | Preston | 252—431 C X |
| 3,150,169 | 9/1964 | Johnson et al. | 252—428 X |
| 3,290,257 | 12/1966 | Bader et al. | 252—428 X |
| 3,484,410 | 12/1969 | Lazarus et al. | 252—431 C X |

PATRICK P. GARVIN, Primary Examiner

U.S. Cl. X.R.
252—431 C, 431 P; 260—75, 76, 77